United States Patent
Forbes et al.

(10) Patent No.: US 7,596,102 B2
(45) Date of Patent: Sep. 29, 2009

(54) IMAGE EXCHANGE FOR IMAGE-BASED PUSH-TO-TALK USER INTERFACE

(75) Inventors: Stephen K. Forbes, Raleigh, NC (US); Jonathan Charles Lohr, Raleigh, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1059 days.

(21) Appl. No.: 11/005,637

(22) Filed: Dec. 6, 2004

(65) Prior Publication Data

US 2006/0120308 A1 Jun. 8, 2006

(51) Int. Cl.
*H04L 12/16* (2006.01)

(52) U.S. Cl. .................. 370/260; 345/419; 345/427; 348/14.01; 370/338; 379/202.01; 455/416; 455/466; 455/518; 709/204; 709/217; 715/753

(58) Field of Classification Search .............. 370/260, 370/278, 401, 261, 338; 709/205, 204, 217; 455/416, 466, 518, 902, 415, 566; 348/14.03, 348/14.08, 14.09, 14.01; 345/419, 427; 379/202.01; 715/753
See application file for complete search history.

(56) References Cited

U.S. PATENT DOCUMENTS

| | | | |
|---|---|---|---|
| 5,533,110 A | 7/1996 | Pinard et al. | |
| 5,907,604 A | 5/1999 | Hsu | |
| 5,999,208 A * | 12/1999 | McNerney et al. | 348/14.08 |
| 6,285,392 B1 * | 9/2001 | Satoda et al. | 348/14.09 |
| 6,292,211 B1 * | 9/2001 | Pena | 348/14.08 |
| 6,331,853 B1 * | 12/2001 | Miyashita | 345/427 |
| 6,545,700 B1 * | 4/2003 | Monroe | 348/14.08 |
| 6,559,863 B1 * | 5/2003 | Megiddo | 715/753 |
| 6,753,857 B1 * | 6/2004 | Matsuura et al. | 345/419 |
| 6,772,195 B1 * | 8/2004 | Hatlelid et al. | 709/204 |
| 6,775,362 B1 | 8/2004 | Ransom | |
| 7,006,098 B2 * | 2/2006 | Bickmore et al. | 345/474 |
| 7,139,767 B1 * | 11/2006 | Taylor et al. | 707/102 |
| 7,146,095 B2 * | 12/2006 | Asami | 386/95 |
| 7,237,004 B2 * | 6/2007 | Slobodin et al. | 709/204 |
| 7,245,275 B2 * | 7/2007 | Okada et al. | 345/32 |
| 7,386,799 B1 * | 6/2008 | Clanton et al. | 715/758 |

(Continued)

OTHER PUBLICATIONS

PCT International Search Report, International Application No. PCT/US2005/030245, Dec. 27, 2005.

(Continued)

*Primary Examiner*—Gerald Gauthier
(74) *Attorney, Agent, or Firm*—Coats & Bennett, P.L.L.C.

(57) ABSTRACT

A visual interface for a PTT user terminal displays user images of participants in a PTT conference. When a PTT conference is established, a controller determines whether an image associated with each participant invited to the PTT conference is stored in memory on the user terminal. For each participant that has an associated image stored on the user terminal, the controller displays the image. For those participants that do not have an associated image stored on the user terminal, the controller generates and sends a request for the image. Upon receipt of the image, the controller displays the image on the user terminal. During the PTT conference, the controller alters the appearance of the images to show the status information of each participant, such as which participant has floor control and presence of participants.

46 Claims, 7 Drawing Sheets

U.S. PATENT DOCUMENTS

| | | | |
|---|---|---|---|
| 7,418,476 B2 * | 8/2008 | Salesky et al. | 709/204 |
| 7,460,861 B2 * | 12/2008 | Zabawskyj | 455/416 |
| 2002/0093531 A1 | 7/2002 | Barile | |
| 2003/0073430 A1 | 4/2003 | Robertson et al. | |
| 2003/0092399 A1 | 5/2003 | Davies | |
| 2003/0158900 A1 * | 8/2003 | Santos | 709/205 |
| 2004/0015548 A1 | 1/2004 | Lee | |
| 2004/0162095 A1 * | 8/2004 | Edwards et al. | 455/518 |
| 2004/0204142 A1 * | 10/2004 | Chen | 455/566 |
| 2005/0021625 A1 * | 1/2005 | Fujimura et al. | 709/204 |
| 2005/0144233 A1 * | 6/2005 | Kjesbu et al. | 709/204 |
| 2005/0287997 A1 * | 12/2005 | Fournier | 455/415 |
| 2006/0019689 A1 * | 1/2006 | Pantalone et al. | 455/518 |
| 2006/0055771 A1 * | 3/2006 | Kies | 348/14.03 |
| 2007/0198650 A1 * | 8/2007 | Hameleers et al. | 709/217 |
| 2008/0096597 A1 * | 4/2008 | Vempati et al. | 455/518 |
| 2008/0239996 A1 * | 10/2008 | Lohmar et al. | 370/261 |

OTHER PUBLICATIONS

Koskelainen et al., "Requirements for Floor Control Protocol," Jul. 29, 2004, 16 pages, http://ietfreport.isoc.org/ids/draft-ietf-xcon-fllor-control-req-01.txt.

Camarillo et al., "The Binary Floor Control Protocol," Apr. 2004, 28 pages, http://standards.ericsson.net/gonzalo/papers/draft-camarillo-xcon-bfcp-00.txt.

* cited by examiner

IMAGE EXCHANGE FOR IMAGE-BASED PUSH-TO-TALK USER INTERFACE

BACKGROUND

The present invention relates generally to wireless communications devices, and more particularly to image exchange in wireless communications devices capable of push-to-talk service.

Push to talk (PTT) service is a half-duplex voice service wherein mobile terminals operate similarly to a walkie-talkie. Only one user speaks at a time while all other users listen. To talk, a participant presses a PTT button and begins speaking while holding the PTT switch. A participant releases the PTT switch when he/she is finished speaking to give other participants a chance to speak. PTT services may be provided over packet-switched wireless networks. Such services are commonly known as PTT over cellular, which is abbreviated PoC. PoC uses the Session Initiation Protocol (SIP) for establishing modifying and terminating sessions. PoC enables group conferences between two or more participants.

Two important aspects of PoC services are floor control and presence services. Floor control is a method of controlling access to a shared resource. Access to the shared resource may be exclusive or non-exclusive. In the context of group PTT conferences, floor control refers to a method of controlling access to the shared communication channel by users, which is typically exclusive. Temporary permission to access the shared communication channel, referred to as the floor, is granted to PoC clients by a floor control server. The floor control server manages the floor and provides notifications to users clients to indicate who currently has control of the floor.

Presence services provide information about the availability and status of users. A presence server maintains the presence status of users (e.g. "reachable," "do not disturb," "unavailable," "offline," etc.), and supports publication of presence information to users. With presence services, a user can make "buddy lists" and check the availability and status of other users.

Mobile terminals with PTT capabilities currently employ a rudimentary interface comprising a list of users in text format and simple icons or graphics to indicate control of the floor and the presence status of users. A more visually-oriented interface would be more appealing to end users, would enhance the overall user experience, and would help in attracting more subscribers to PTT services.

SUMMARY

The present invention provides a visual interface for a PTT user terminal, and a method for exchanging image data between terminals. The user terminal includes a memory to store the images of individuals with whom a user converses. For example, the user terminal may store images of a user's personal contacts in the user's address book or contact list. When engaged in a PTT conference, the controller determines which participants have an associated image stored in memory. If a participant has an image stored in memory on the user terminal, the controller displays the image in a graphic interface. If the participant does not have an image stored on the user terminal, the controller generates and sends a request message requesting the image. By way of example, the request message may include reserved bits indicating the request for the participant's image, and may be sent to an entity in a wireless communications network or to the participant. Upon receipt of the requested image, the controller displays the image on the graphical interface.

During the PTT conference, the controller may receive status information regarding the conference participants. This may include status information, such as who has control of the floor and the presence of participants. The controller alters the images responsive to this status information. In one embodiment of the invention, for example, the controller displays the image of each participant invited to the conference in the graphical interface. The image of each participant that has already joined the conference may be displayed in color, while the images of those yet to join may be displayed in a grayscale. As each participant joins the conference, the controller may change the image to color. Additionally, the controller may indicate which participant has control of the floor by framing the participant's image in a distinctive color. Thus, the appearance of a participant's image provides a visual clue that instantly informs the user about the status of other participants in the group PTT conference.

DETAILED DESCRIPTION OF THE INVENTION

Figure 1:
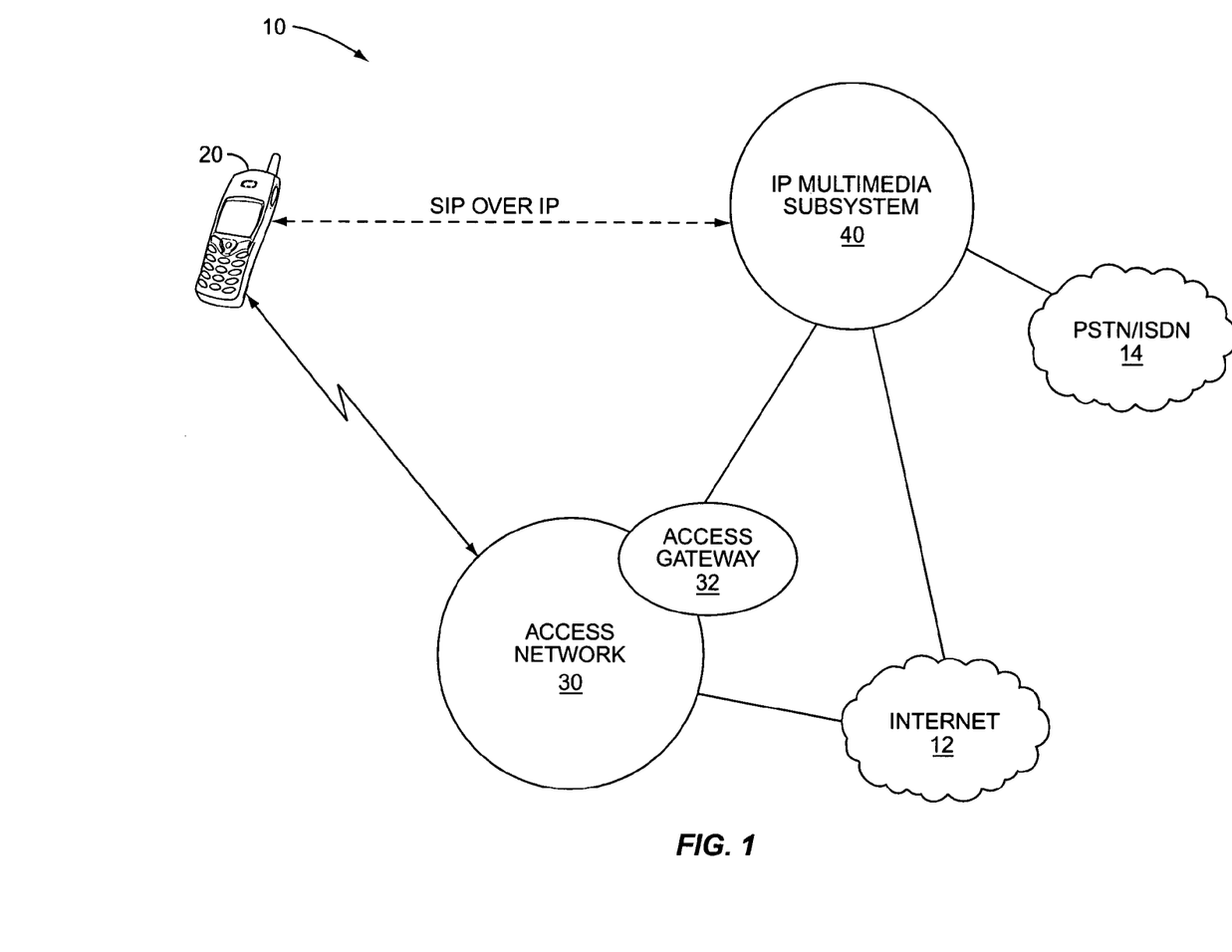
FIG. 1 is a block diagram that illustrates a wireless network including an IP multimedia subsystem (IMS) for providing IP services to user terminals.

FIG. 1 illustrates a mobile communication network 10 in which the present invention may be employed. While the present invention is described in the context of a mobile communication network 10, those skilled in the art will appreciate that the present invention may also be used in fixed networks.

The mobile communication network 10 comprises a plurality of user terminals 20 (only one is shown), an access network (AN) 30 providing wireless communication services to the user terminals 20, and an IP Multimedia Subsystem (IMS) 40. The access network 30 is preferably a packet-switched network that uses any known access technology, such as TDMA, CDMA, or GSM. The access network 30 may, for example, comprise a General Packet Radio Services (GPRS) network, cdma2000 network or UMTS network. The access network 30 provides a connection to the Internet 12 or other packet data network (PDN) for packet-switched services such as web browsing and email, and may provide a connection to the Public Switched Telephone Network (PSTN) 14 and/or the Integrated Digital Services Network (ISDN) 16 for circuit-switched services such as voice and fax services. The access network 30 includes an access gateway 32 for interconnecting with the IMS 40. The access gateway 32 may comprise a GPRS Gateway Serving Node (GGSN)

for GPRS networks or a Packet Data Serving Node (PDSN) for cdma2000 networks. The IMS 40 provides access independent, IP-based multi-media services to user terminals 20 and supports a variety of IP services including push-to talk over cellular (PoC), voice over IP (VoIP), video and audio streaming, email, web browsing, videoconferencing, instant messaging, presence and other services.

Figure 2:
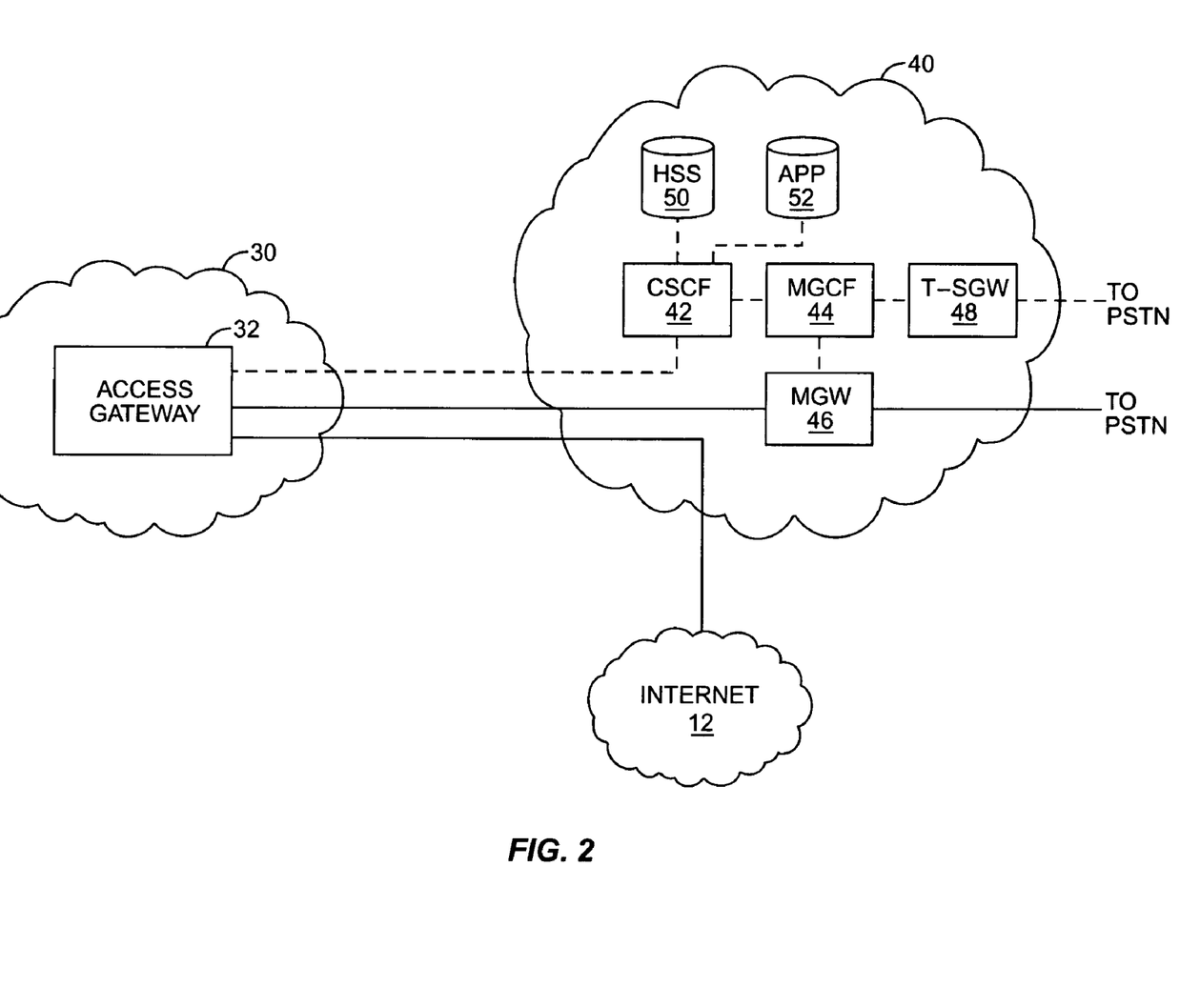
FIG. 2 is a block diagram illustrating the basic functional elements of the IMS.

FIG. 2 illustrates the basic elements of the IMS 40. The dotted lines in FIG. 2 represent signaling messages and the solid lines represent data and/or media streams. The IMS 40 includes one or more Call State Control Functions (CSCFs) 42, a Media Gateway Control Function (MGCF) 44, a Media Gateway (MGW) 46, a Transport Signaling Gateway (T-SGW) 48, and a Home Subscriber Server (HSS) 50, which are interconnected by an IP network. The IMS 40 may further include an application server 52 providing multimedia services to user terminals 20. The application server 52 could alternatively be located in an external network.

The CSCFs 42 function as SIP servers to process session control signaling used to establish, modify and terminate a communication session. Functions performed by the CSCFs 42 include call control, address translation, authentication, capability negotiation, and subscriber profile management. The HSS 50 interfaces with the CSCFs 42 to provide information about the subscriber's current location and subscription information. The application server 52 provides multimedia services or other IP services to user terminals 20. The MGCF 44, MGW 46 and T-SGW 48 support interworking with external networks, such as the PSTN or ISDN. The MGCF 44 controls one or more MGWs 46 that manage the connections between the external networks and the IMS 40. The MGCF 44 configures the MGW 46 and converts SIP messages into a different format, such as ISDN User Part (ISUP) messages. The MGCF 44 forwards the converted messages to the T-SGW 48, which interfaces the IMS 40 to external signaling network, such as the SS7 network. The T-SGW 48 includes a protocol converter to convert IP messages to SS7 and vice versa. The IMS 40 may include additional elements, which are not shown in FIG. 2 and are not important to understand the present invention.

The IMS 40 uses open interfaces and an access independent session control protocol (SCP), such as SIP, to support multi-media applications. It should be noted that while one embodiment of the invention as described herein uses SIP, those skilled in the art will appreciate that the present invention may use other SCPs as well. For example, another well-known protocol comparable to the SIP is H. 323.

SIP is a session control protocol for establishing, modifying, and terminating communication sessions between one or more participants. These sessions may include, for example, Internet multimedia conferences, Internet telephony calls, and multimedia distributions. SIP uses ASCII-based signaling messages to establish a communication session between two or more participants. Users are identified by a unique address referred to herein as the SIP address. Users register with a registrar server using their assigned SIP addresses, and the registrar server provides this address to a location server upon request. Once a session is established, the distribution of multimedia content among users may be negotiated using a Session description protocol (SDP). SIP is described in the IETF document RFC 3261, while SDP is described in IETF RFCs 2327 and 3264—both of which are incorporated herein by reference.

Figure 3:
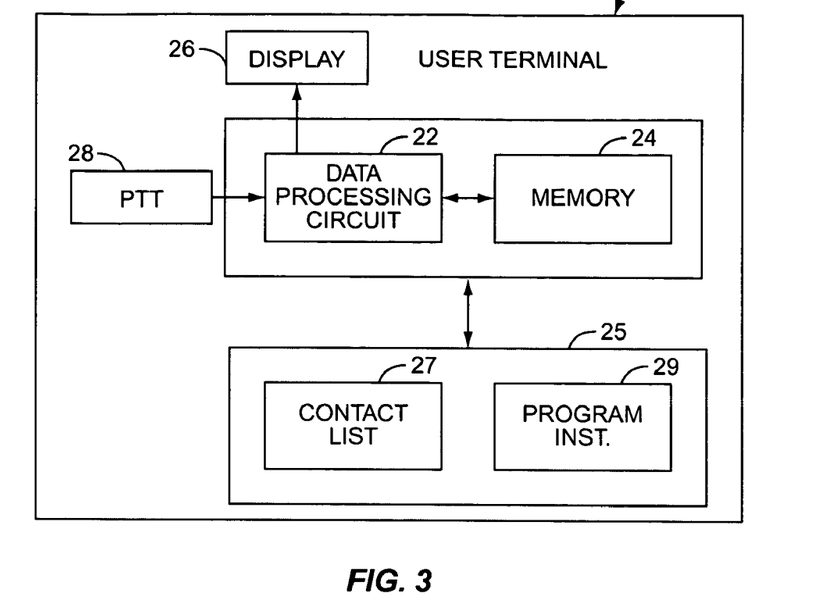
FIG. 3 is a block diagram of an exemplary user terminal according to one embodiment of the present invention.
Figure 4:
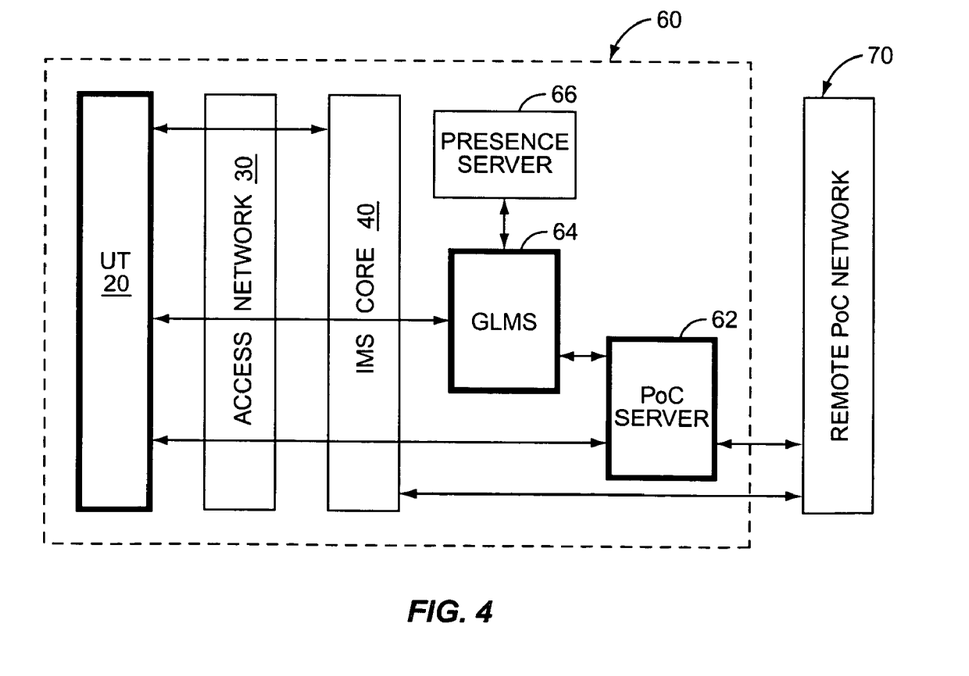
FIG. 4 is a block diagram illustrating the basic architecture and service elements for PTT services.

The IMS 40 and SIP may be used to implement push to talk over cellular (PoC) services. FIG. 3 illustrates some of the functional elements of user terminal 20, which include a data processing circuit 22 and memory 24. FIG. 4 illustrates the functional elements of a PoC network 60 as described in the technical specification "Push-to-talk over Cellular (PoC); Architecture; PoC Release 2.0 (V2.0.8)" published jointly by Comneon, Ericsson, Motorola, Nokia, and Siemens. The elements shown in bold represent the basic elements of the PoC network 60, which include the user terminal 20, a PoC server 62, a Group and List Management Server (GLMS) 64 and a Presence Server (PS) 66.

As seen in FIG. 3, user terminal 20 includes data processing circuit 22, memory 24, a display 26, and a PTT actuator 28. The data processing circuit 22 executes computer programs and applications stored in memory 24, and may comprise one or more microprocessors, hardware, firmware, or a combination thereof. Memory 24 stores program instructions and data and may be embodied in one or more memory devices, which may include both volatile and non-volatile memory. Display 26 displays a graphical interface to the user, while PTT actuator 28 permits the user of terminal 20 to request control of the floor and transmit voice and/or data to one or more remote parties.

In one exemplary embodiment, a PTT client 25 running on a microprocessor enables PTT functionality in the user terminal 20. Typically, the user invokes the PTT client 25 by selecting a menu item from the graphical interface displayed to the user, or by depressing PTT actuator 28. Additionally, memory 24 may store the user's personal contacts in a contact list or address book. Images or other graphical representations of the contacts may be associated with each contact and stored in the contact list. Memory also stores program instructions for the PTT client 25. The PTT client 25 uses SIP to establish, modify and maintain communication sessions as defined in the Internet Engineering Task Force standard RFC 3050, 3264, 3265, 3311. The IMS 40 routes SIP signaling between the PTT client 25 and the PoC server 62 and GLMS 64.

As seen in FIG. 4, PoC server 62 is a network entity that provides services needed for PoC functionality, such as SIP session handling, group session handling, access control, floor control functionality, participant identification and media distribution. PoC server 62 also facilitates connection to one or more remote PoC networks 70 serving other user terminals 20. The PoC server 62 may function as a participating PoC server 62 or a controlling PoC server 62. The PoC server 62 is an endpoint for SIP, RTP (Real-Time Transport Protocol) and RTCP (Real Time Transport Control Protocol) signaling. As previously stated, SIP is one signaling protocol used to establish, modify and terminate communication sessions in one embodiment of the present invention; however, other signaling protocols may be used. RTP is the protocol used to transport voice packets, and RTCP is the protocol used to perform floor control during group PTT sessions. RTCP is described in the IETF standard RFC 3550.

The GLMS 64, also referred to herein as the group server 64, is responsible for managing group lists, contact lists, and access lists associated with each user terminal. A group list is a list of PTT groups to which a user belongs. Each PTT group comprises a collection of PoC user identities defined by the user that creates the group. The user creating the group is the group owner, and may modify and/or delete the group. Once created, the group is assigned a SIP address that serves as a group identifier. The contact list is a kind of address book accessible by user terminals 20, and includes addresses for other users or groups. Contact lists resident on GLMS 64 may include an image or other graphical identifier associated with each user or group. Access lists define access restrictions for each user terminal 20. A user terminal 20 uses the access lists maintained by GLMS 64 to provide or deny access to other user terminals 20 for future group sessions.

PTT groups can be ad hoc or persistent. An ad hoc group exists only for the current session and a temporary group identifier is assigned at the time the group PTT session is established. Persistent groups are stored in the GLMS 64 and have a permanent group identifier. To establish a group PTT session, the user terminal initiating the group call sends an invitation to the PoC server 62 designating the called party or parties. The PTT request typically includes the SIP addresses of the called parties in the case of an ad hoc group PTT session, or the SIP address of the group in the case of a persistent group PTT session. The PoC server 62 authorizes the PTT session depending on information stored in the GLMS 64. If the PTT session is authorized, the PoC server 62 relays the invitation to the called parties and establishes the communication session once the invitation is accepted.

The PS 66 maintains the presence status of PTT clients 26, and supports publication of presence information to PTT clients 26. The presence status may include, for example, "reachable," "unavailable," "do-not-disturb," and "offline." A PTT client 25 may publish its presence status to the PTT server 66, which in turn provides presence notifications to other PTT clients 26. As described in more detail below, user terminal 20 may use the presence information to graphically indicate a remote party's status in a PTT conference call, for example. Signaling between the PTT client 25 and the presence server 66 is via the IMS 40 using SIP.

During a group PTT session, for example, a PTT conference call, conference participants may connect to the same PoC server 62 using SIP. Once the session is established, the PoC server 62 performs floor control and media distribution. User terminals 20 request a floor grant from the PoC server 62 whenever PTT actuator 28 is depressed, and the PoC server 62 typically grants it on a contention basis. The user terminal 20 holding the floor can then send media and voice data to the PoC server 62 for distribution to the other participants on the call. As previously stated, RTP is used for transport of voice packets while RTCP is used for floor control.

The present invention provides a visual interface for PTT conferences. A user stores images of the user's personal contacts along with other contact information in a contact list or address book. During a PTT conference, the user images of conference participants are retrieved and displayed in graphical interface on display 26. Changes in the appearance of the user images provide status information, such as which participant has control of the floor and the presence status of conference participants. However, in some cases, a user may not have an image for each participant in the PTT conference call stored in memory. To implement the visual interface, the present invention also provides a method by which user terminal 20 may request and receive images of participants that are not stored in memory 24.

Figure 5:
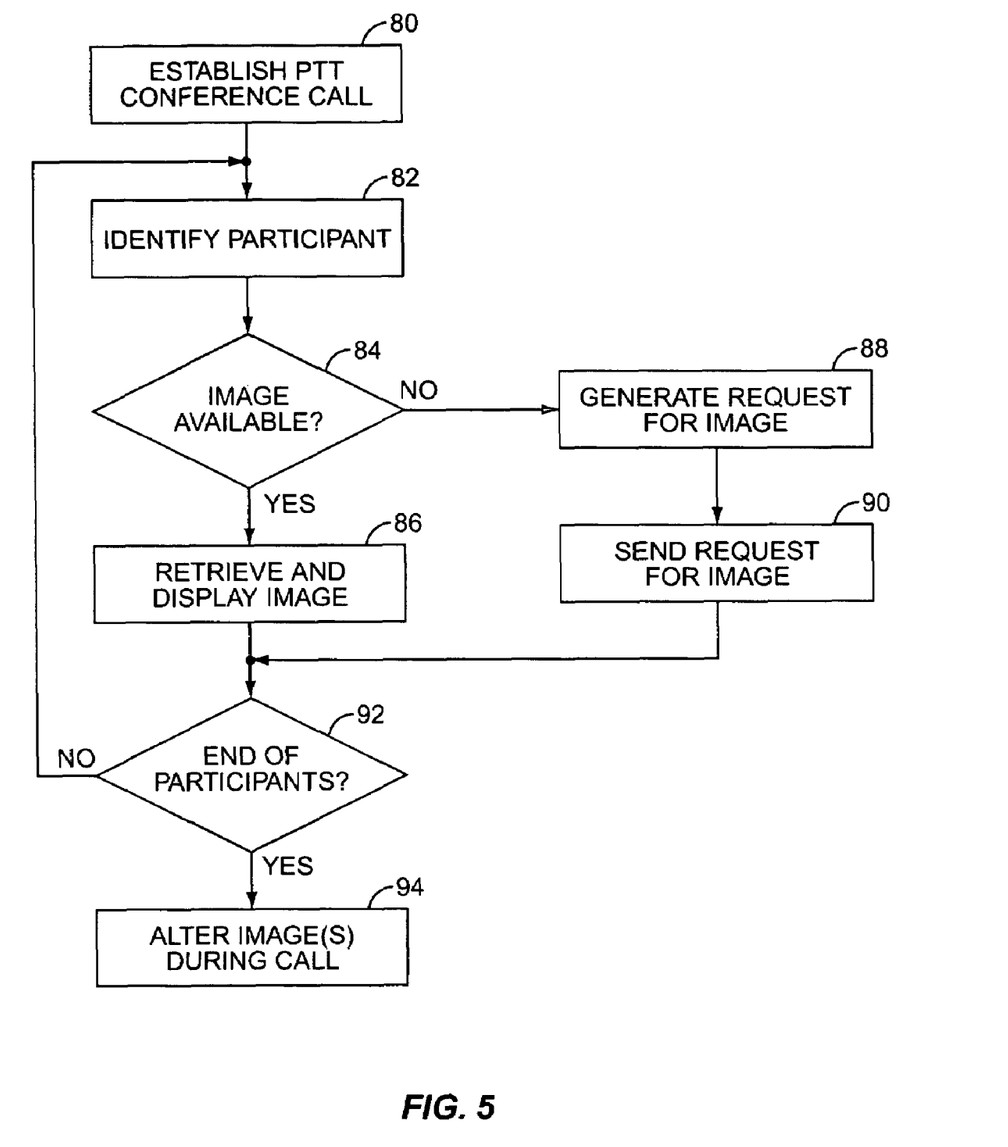
FIG. 5 illustrates one method of image exchange according to one embodiment of the present invention.

FIG. 5 illustrates one embodiment where user terminal 20 displays images associated with participants that are stored in memory 24, and sends a request message for those that are not. FIG. 5 begins with the establishment of a PTT conference call (box 80). As previously stated, the PTT conference call may comprise one or more remote parties invited to participate in the call. Data processing circuit 22, which in one embodiment is a controller, identifies each participant invited to the conference call (box 82), and determines whether an image associated with the identified participant is stored in memory 24 (box 84). If there is an image stored in memory 24, data processing circuit 22 retrieves and displays the image in the graphical interface (box 86). However, if a conference participant does not have an associated image stored in memory 24 (box 84), data processing circuit 22 will generate a request message (box 88) and transmit the request message (box 90) to the participant to obtain the image. In an alternative embodiment, the request message may be sent to GLMS 64 in network 60. In either case, data processing circuit 22 then checks to see if the end of the participant list has been reached and either identifies the next participant (box 82), or, as described later in more detail, alters the displayed images (box 94) during the PTT conference call.

Figure 6:
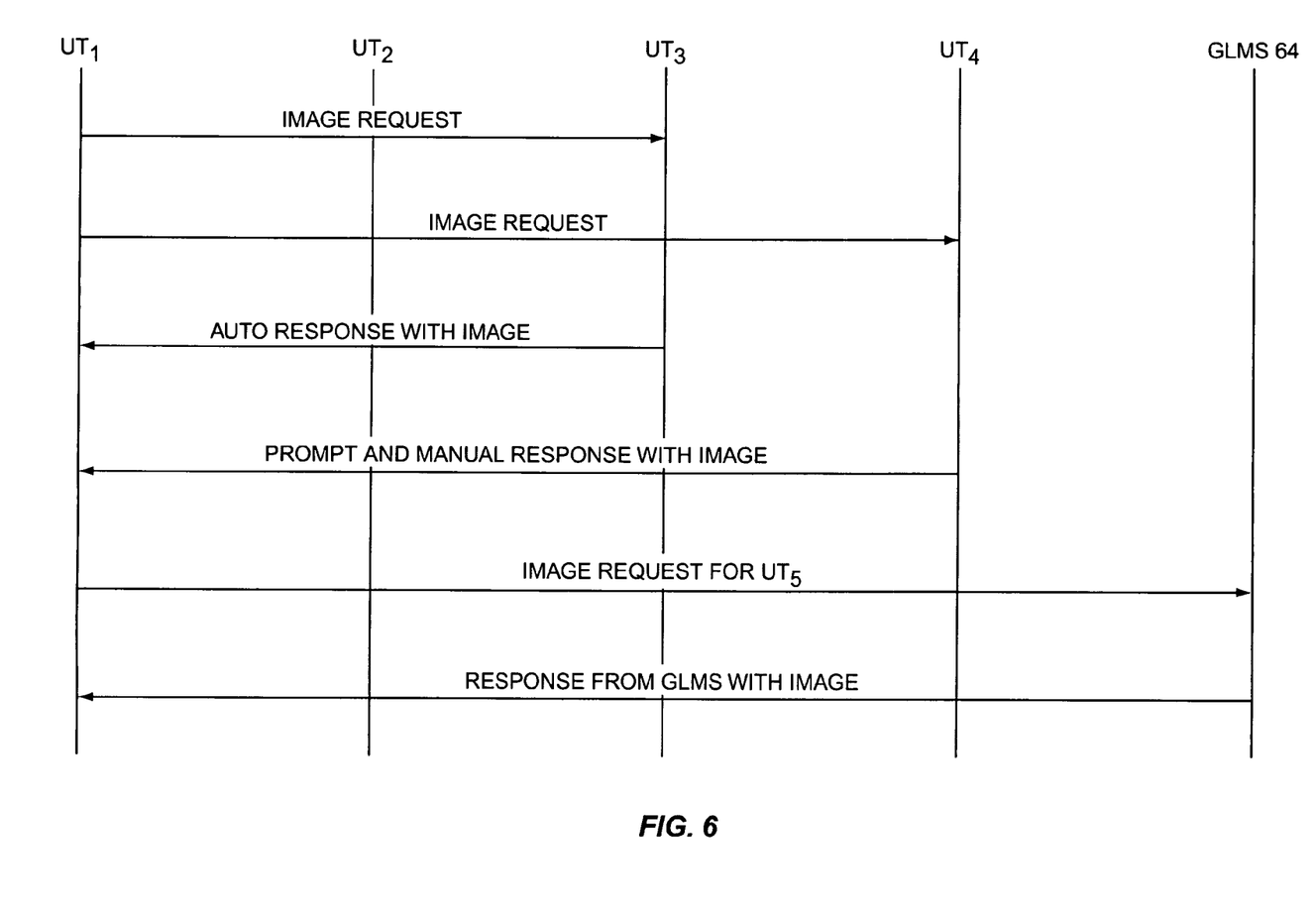
FIG. 6 illustrates a possible signal flow between user terminals and/or network entities used to request and receive images from remote parties.

FIG. 6 illustrates a signaling flow where data processing circuit 22 generates and sends a request message to request an image of participants that do not have associated images stored in memory 24 on the user's terminal 20. FIG. 6 illustrates the signaling flow only from the viewpoint of a single user terminal 20 (i.e., $UT_1$). However, this is merely for simplicity's sake. Those skilled in the art should appreciate that the signal flow shown in FIG. 6 may be executed by any or all of the user terminals $UT_1 \ldots UT_5$ substantially simultaneously.

As seen in FIG. 6, $UT_1$ invites five participants $UT_2 \ldots UT_5$ to the PTT conference call. $UT_1$ has an image associated with participant $UT_2$, and thus, no request message needs to be generated and sent. $UT_1$ simply retrieves the image associated with $UT_2$ from memory 24, and displays it in the graphical interface. However, $UT_1$ does not have images stored in memory 24 for users $UT_3$, $UT_4$, and $UT_5$. Therefore, data processing circuit 22 generates and sends the request messages to obtain these images. This may be accomplished in various ways.

One way is to generate and send the request message to the participant's user terminal 20. In these cases, it is expected that the participant's user terminal 20 stores participant's image. In FIG. 6, for example, $UT_1$ sends the request message to $UT_3$ and $UT_4$ who have their respective images stored locally on their user terminals 20. The responses from these participants may depend upon the capabilities of their user terminals and/or how each participant configures his or her user terminal 20. For example, some user terminals may be capable of responding to an image request message by automatically sending the participant's image to the requesting user terminal 20. This embodiment requires little or no interaction by a participant. In FIG. 6, $UT_3$ receives the image request from $UT_1$, and automatically responds by transmitting $UT_3$'s image to $UT_1$.

Alternatively, a user terminal 20 may not be capable of automatic responses, such as a legacy terminal, or may be configured by a participant not to respond automatically. In these cases, user terminal 20 may transmit the image to the requesting user terminal responsive to some manual user input. This allows a participant to limit the distribution of his or her image. In one embodiment, for example, the participant may receive a text message, such as an SMS message, requesting their image. In other embodiments, data processing circuit 22 may cause a prompt to be displayed on display 26 that asks the user to confirm the transmission of their image. In either case, the user may press a pre-configured key on their user terminal 20, for example, to grant or deny the request. Provided the user grants the request, the user terminal 20 could respond by transmitting the user's image in a message to the requesting user terminal. As seen in FIG. 6, $UT_4$ transmits an image to the requesting user $UT_1$ only after confirming the transmission manually. In other embodiments, the user may configure their user terminal 20 to deny all requests for images.

In addition to the automatic and manual methods described above, the present invention also contemplates a method of image-exchange for legacy user terminals 20. Specifically, legacy terminals may support PTT functionality but not terminal-based image exchange as described above. In these cases, a user may store his or her image on a network entity, such as GLMS 64. A requesting user terminal 20 may transmit a request to the GLMS 64, which could return a participant's image to the requesting user terminal. In FIG. 6, $UT_1$ sends a request message requesting the image associated with $UT_5$ to GLMS 64, which may or may not prompt the user of $UT_5$ for confirmation. GLMS 64 retrieves the image associated with $UT_5$ and transmits the image to the requesting user $UT_1$.

The request and response messages may be generated in a variety of ways, and transmitted according to any known protocol. In one embodiment for example, the request message comprises a Short Message Service (SMS) message. SMS is a text-only messaging system used in wireless communications networks. In one embodiment of the present invention, data processing circuit 22 may generate an SMS message having one or more bits in the header to indicate a request for the image. In an alternate embodiment, the request message could include text or other apropriate indicators embedded in the body of an SMS message. Text messages may help legacy user terminals 20 to receive requests for images and respond accordingly. Likewise, the response message from the user terminal 20 and/or GLMS 64 may comprise a Multimedia Messaging System (MMS) message. MMS-enabled user terminals permit users to compose and send messages having multimedia content, such as images, audio, and/or video. The receiving user terminal 20 or GLMS 64 could interpret a received SMS request message, and respond with an MMS message that includes the user's image.

Figure 7:
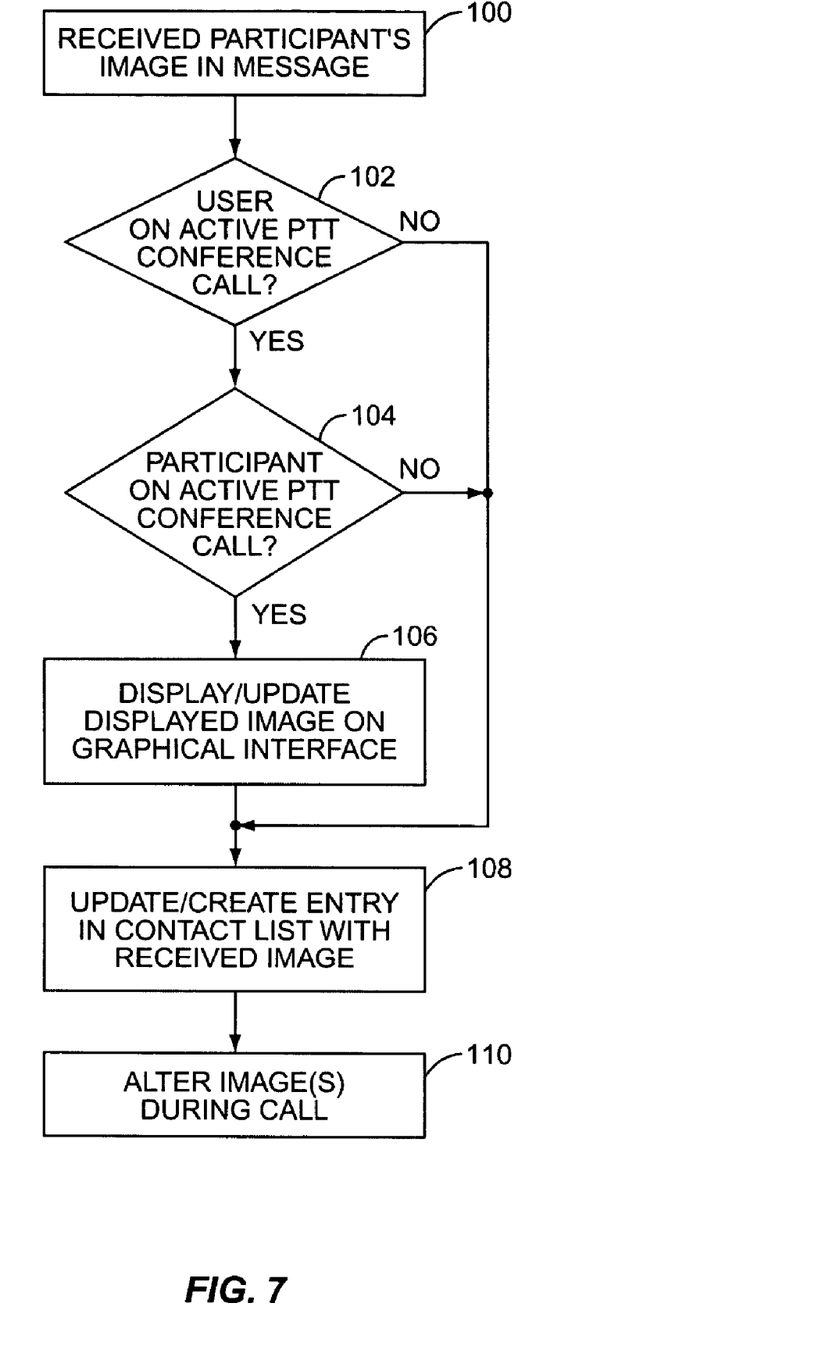
FIG. 7 illustrates one method by which a user terminal processes images received from remote parties according to one embodiment of the present invention.

Once a requested image is retrieved, it is sent to the requesting user. FIG. 7, for example, illustrates one method by which the requesting user terminal 20 receives and utilizes the requested image. In FIG. 7, the response message having the participant's image is received by the requesting user terminal (box 100). Data processing circuit 22 then determines whether the user of user terminal 20 is on an active PTT conference call (box 102), and whether the participant whose image is received is also active on the current PTT conference call (box 104). If both the user and the participant are on the PTT call, data processing circuit 22 displays the requested image received from the remote participant in the graphical interface (box 106). Data processing circuit 22 may then update or create an entry in the user's contact list as desired (box 108), and alter the image(s) of the remote participants according to any received status (110). It should be noted that data processing circuit 22 may also use these images for other functionality, such as image-based caller-ID, for example. If, however, the user is either not on an active PTT conference call, or receives an image from a user that is not on the active PTT conference call (boxes 102, 104), data processing circuit may update or create an entry in the user's contact list accordingly (box 108).

Figure 8:
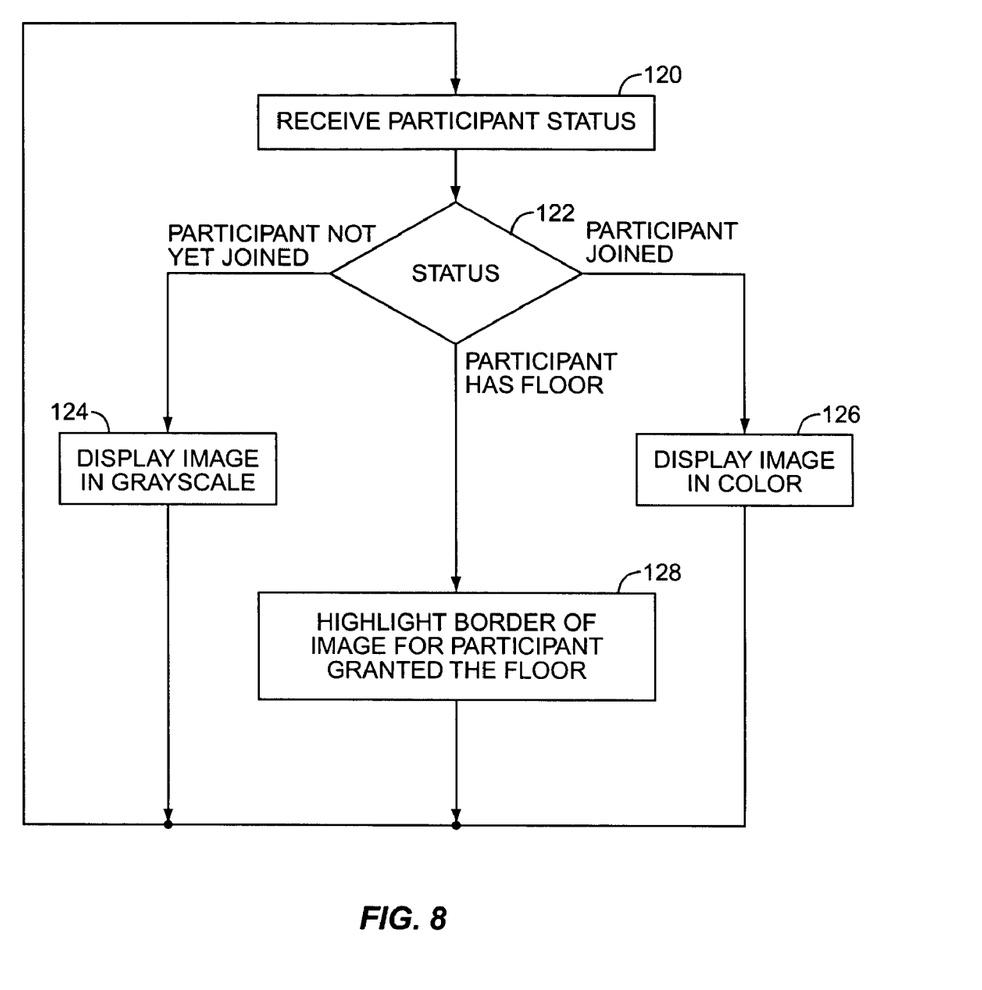
FIG. 8 illustrates a method by which a user terminal alters the images during the course of a PTT conference call according to one embodiment of the present invention.

As seen in FIG. 8, data processing circuit 22 may be configured to alter the image(s) of the participant(s) on the active PTT conference call as their status changes. In this embodiment, PS 66 periodically sends the status of one of more participants to user terminal 20 (box 120). Upon receipt, data processing circuit 22 may use the received status to determine how to alter the image associated with the participant whose status has changed (box 122). For example, if PS 66 and/or PoC server 62 reports that an invited participant has not yet joined the PTT conference call, data processing circuit 22 could display that user's image in black and white or grayscale (box 124). Once PS 66 and/or PoC server 62 reports that the participant has joined the PTT conference call, data processing circuit 22 could alter the associated image to appear in color (box 126). When a given participant gains floor control, data processing circuit 22 could indicate this by changing the color of the image of the user having floor control to a distinctive color, or place a highlighted border around the participant's image (box 128). Other methods of altering a displayed user's image include adding/removing icons and/or text to the image, and causing the highlighted border to blink or flash. Once the participant releases the floor, the distinctive color/highlighted border would be removed.

The present invention has been discussed in terms of a wireless network that includes an IP multimedia subsystem (IMS) that provides users with IP services. However, it should be understood that the present invention may be accomplished without the existance of the IMS subsystem. In one embodiment, for example, the present invention may exchange images over access network 30 and Internet 12. In another embodiment, images may be exchanged over access network 30 alone. In these embodiments, user terminals 20 could be provided with their own IP addresses to facilitate messaging and image exchange.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method implemented in a user terminal of providing status information during a push to talk (PTT) conference comprising:
    establishing a PTT conference;
    determining whether an image associated with a conference participant is stored in memory on the user terminal;
    displaying the image associated with the conference participant in a graphical interface if the image is stored in memory on the user terminal; and
    requesting the image associated with the conference participant if the image is not stored in memory on the user terminal.

2. The method of claim 1 further comprising receiving the requested image associated with the participant, and displaying the requested image in the graphical interface.

3. The method of claim 2 further comprising associating the requested image with the participant, and adding the requested image to memory.

4. The method of claim 2 wherein the requested image is received in an MMS message.

5. The method of claim 2 wherein the image is received from a server in a wireless communications network.

6. The method of claim 2 wherein the image is received from the participant.

7. The method of claim 1 wherein determining whether an image associated with a participant in the PTT conference is stored in memory comprises identifying the participant by comparing information associated with the participant to data stored in memory.

8. The method of claim 1 wherein requesting the image associated with the conference participant comprises generating a text message requesting the image.

9. The method of claim 8 wherein the text message comprises a SMS message.

10. The method of claim 8 wherein the message includes one or more reserved header bits that indicate the request for the image associated with the participant.

11. The method of claim 1 further comprising receiving a new image of the participant during the PTT conference.

12. The method of claim 11 further comprising replacing the displayed image of the participant in the graphical interface with the new image of the participant.

13. The method of claim 11 further comprising updating the image associated with the participant stored in memory of the user terminal with the new image.

14. The method of claim 1 further comprising altering the appearance of the image to provide status information about the participant.

15. The method of claim 14 wherein altering the appearance of the image to provide status information comprises changing the color of the image to indicate the presence status of the participant.

16. The method of claim 14 wherein the image of the participant is displayed in grayscale to indicate that the participant has not yet joined the PTT conference.

17. The method of claim 14 wherein the image of the participant is displayed in color to indicate that the participant has joined the PTT conference.

18. The method of claim 14 wherein altering the appearance of the image to provide status information about the participant comprises altering the image to indicate that the participant has control of the floor during the PTT conference.

19. The method of claim 18 wherein altering the image to indicate that the participant has control of the floor comprises adding a border with a distinctive color to the image.

20. The method of claim 1 further comprising receiving an image transfer request message from a remote party requesting a user image associated with the user of the user terminal.

21. The method of claim 20 further comprising providing the user image based on an image transfer option preconfigured by the user of the user terminal.

22. The method of claim 21 further comprising prompting the user to approve the image transfer request.

23. The method of claim 21 further comprising automatically transferring the user image responsive to the image transfer request.

24. A user terminal comprising:
a transceiver to communicate with a participant in a push-to-talk (PTT) conference call via a wireless communications network;
a PTT actuator to activate the transceiver;
a display to display a graphical interface to a user of the user terminal;
a controller configured to display an image associated with the participant in the graphical interface if the image is stored in memory on the user terminal, and to request the image associated with the participant if the image is not stored in memory on the user terminal.

25. The user terminal of claim 24 wherein the controller is configured to display the requested image in the graphical interface when the requested image is received.

26. The user terminal of claim 25 wherein the controller is configured to associate the requested image with the participant, and add the requested image to memory.

27. The user terminal of claim 25 wherein the controller is configured to determine whether the image associated with a participant is stored in memory, and to display the image or request the image based thereon.

28. The user terminal of claim 25 wherein the controller is configured to generate a message requesting the participant's image if the image is not stored in memory on the user terminal.

29. The user terminal of claim 25 wherein the controller is configured to replace the displayed image of the participant in the graphical interface with a new image of the participant received during the PTT conference.

30. The user terminal of claim 29 wherein the controller is configured to update the image associated with the participant stored in memory of the user terminal with the new image.

31. The user terminal of claim 24 wherein the controller is configured to alter the appearance of the image to provide status information about the participant.

32. The user terminal of claim 31 wherein the controller is configured to alter the color of the image to indicate the presence status of the participant.

33. The user terminal of claim 31 wherein the controller is configured to display the image in grayscale to indicate that the participant has not yet joined the PTT conference.

34. The user terminal of claim 31 wherein the controller is configured to display the image in color to indicate that the participant has joined the PTT conference.

35. The user terminal of claim 31 wherein the controller is configured to alter the image to indicate that the participant has control of the floor during the PTT conference.

36. The user terminal of claim 35 wherein the altered image includes a border with a distinctive color.

37. The user terminal of claim 24 wherein the controller is configured to provide a user image associated with the user of the user terminal to the participant based on an option preconfigured by the user.

38. The user terminal of claim 37 wherein the controller is configured to automatically send the user image to the participant upon receiving a request for the user image.

39. The user terminal of claim 37 wherein the controller is configured to prompt the user prior to sending the user image to the participant.

40. A method implemented in a user terminal of providing status information during a push to talk (PTT) conference:
establishing a PTT conference with a remote party;
determining whether an image associated with the identified remote party is stored in memory on the user terminal;
displaying an image associated with the remote party in a graphical interface if the image is stored in memory on the user terminal; and
requesting the image associated with the remote party if the image is not stored in memory on the user terminal.

41. The method of claim 40 wherein requesting the image associated with the remote party comprises transmitting a request message requesting the image.

42. The method of claim 41 wherein the request message comprises one or more reserved header bits indicating the request for the image associated with the remote party.

43. The method of claim 41 further comprising receiving the requested image at the user terminal, and displaying the requested image in the graphical interface.

44. The method of claim 40 further comprising altering the image associated with the remote party to provide a status of the remote party.

45. The method of claim 44 wherein altering the image comprises altering the image responsive to the remote party receiving control of the floor during the PTT conference.

46. The method of claim 44 wherein altering the image comprises altering the image responsive to whether the remote party has joined the PTT conference.

* * * * *

UNITED STATES PATENT AND TRADEMARK OFFICE
CERTIFICATE OF CORRECTION

PATENT NO.       : 7,596,102 B2
APPLICATION NO.  : 11/005637
DATED            : September 29, 2009
INVENTOR(S)      : Forbes et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1331 days.

Signed and Sealed this

Twenty-eighth Day of September, 2010

David J. Kappos
*Director of the United States Patent and Trademark Office*